(12) United States Patent
Ryotaro

(10) Patent No.: US 8,749,606 B2
(45) Date of Patent: Jun. 10, 2014

(54) OPTICAL SCANNING DEVICE AND IMAGE FORMING APPARATUS EQUIPPED WITH THE SAME

(71) Applicant: Kyocera Document Solutions Inc., Osaka (JP)

(72) Inventor: Todokoro Ryotaro, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/850,870

(22) Filed: Mar. 26, 2013

(65) Prior Publication Data

US 2013/0258033 A1 Oct. 3, 2013

(30) Foreign Application Priority Data

Mar. 27, 2012 (JP) ................. 2012-072597

(51) Int. Cl.
*B41J 15/14* (2006.01)
*B41J 27/00* (2006.01)
*G02B 7/02* (2006.01)

(52) U.S. Cl.
USPC ............................ 347/242; 347/257; 359/819

(58) Field of Classification Search
USPC .................... 347/224, 241–245, 256–258; 359/205.1, 206.1, 811, 812, 819
See application file for complete search history.

(56) References Cited

U.S. PATENT DOCUMENTS

| 5,521,763 | A | * | 5/1996 | Ono et al. | 359/819 |
| 5,526,193 | A | * | 6/1996 | Anzai | 359/819 |
| 6,657,760 | B2 | * | 12/2003 | Fukita et al. | 359/198.1 |

FOREIGN PATENT DOCUMENTS

| JP | 2007-127792 | | 5/2007 | | |
| JP | 2007127793 A | * | 5/2007 | ............. | G02B 26/10 |

* cited by examiner

*Primary Examiner* — Hai C Pham
(74) *Attorney, Agent, or Firm* — K&L Gates LLP

(57) ABSTRACT

An optical scanning device includes an optical element, an optical base, a height positioning boss, and a bonding portion. The optical element is positioned on the optical base. The height positioning boss is provided in at least one of the optical element and the optical base and positions the optical element with respect to vertical orientation. The bonding portion is provided in at least one of the optical element and the optical base. A longitudinally central portion of the optical element is bonded to the bonding portion.

8 Claims, 7 Drawing Sheets

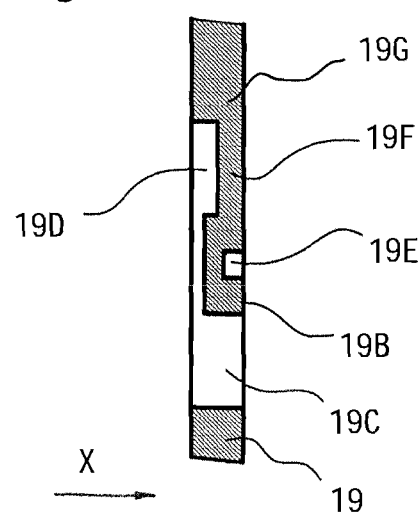

OPTICAL SCANNING DEVICE AND IMAGE FORMING APPARATUS EQUIPPED WITH THE SAME

INCORPORATION BY REFERENCE

This application is based upon, and claims the benefit of priority from the corresponding Japanese Patent Application No. 2012-072597, filed on Mar. 27, 2012, the entire contents of which are incorporated herein by reference.

BACKGROUND

The present disclosure relates to optical scanning devices wherein optical elements are bonded to an optical base using an adhesive and image forming apparatus equipped with such optical scanning devices.

In some copiers, printers, and other image forming apparatuses, an image is formed on a recording medium, such as paper, by an electrophotographic method. In such image forming apparatuses, an image carrier charged by a charger is scanned with light by an optical scanning device. As a result, an electrostatic latent image corresponding to image information is formed on the surface of the image carrier. The electrostatic latent image is developed by a developing device so that the electrostatic latent image is visualized as a toner image. The toner image is transferred onto the recording medium by a transfer device. The recording medium onto which the toner image has been thus transferred is transported to a fixing device. The fixing device heats and presses the recording medium so as to fix the toner image onto the recording medium. The recording medium to which the toner image has been fixed is ejected outside of the apparatus. Thus, a series of image forming operations are completed.

In the optical scanning device, light emitted from a light source such as a laser diode travels to a deflector such as a polygon mirror through a collimator lens and a cylindrical lens. Furthermore, the optical scanning device causes the light deflected by the deflector to form an image through an fθ lens so that the image carrier, such as a photoconductor drum, is scanned with the deflected light.

In the optical scanning device, in order to achieve a reduction of the number of components, maintain high optical performance, and the like, there is a securing method in which optical elements such as a collimator lens, a cylindrical lens, and an fθ lens are, for example, directly secured to an optical base with an adhesive.

However, when an optical element such as an elongated fθ lens is bonded to the optical base with an adhesive, the optical element and the optical base may be thermally expanded by temperature change occurring due to, for example, drive of the optical scanning device. When thermal expansion occurs, an excessive force is applied to a bonded portion due to the difference between the linear expansion coefficient of the optical element and that of the optical base. This leads to the occurrence of problems such as deformation or strain of the optical element or separation of the optical element.

In addition, there is a method in which an elastically deformable portion is formed in either the lens or the optical base, and the lens is secured to the optical base through the elastically deformable portion when the lens is not positioned in a vertical direction.

SUMMARY

An optical scanning device according to an embodiment of the present disclosure includes an optical element, an optical base, a height positioning boss, and a bonding portion. The optical element is positioned on the optical base. The height positioning boss is provided in at least one of the optical element and the optical base and positions the optical element with respect to vertical orientation. The bonding portion is provided in at least one of the optical element and the optical base. A longitudinally central portion of the optical element is bonded to the bonding portion.

An image forming apparatus according to another embodiment of the present disclosure includes an image carrier and an optical scanning device. The optical scanning device scans the image carrier with light. The optical scanning device includes an optical element, an optical base, a height positioning boss, and a bonding portion. The optical element is positioned on the optical base. The height positioning boss is provided in at least one of the optical element and the optical base and positions the optical element with respect to vertical orientation. The bonding portion is provided in at least one of the optical element and the optical base. A longitudinally central portion of the optical element is bonded to the bonding portion.

Additional features and advantages are described herein, and will be apparent from the following Detailed Description and the figures.

BRIEF DESCRIPTION OF THE FIGURES

FIG. 7 is a sectional view taken along line VII-VII in FIG. 6.

DETAILED DESCRIPTION

An embodiment according to the present disclosure will be described below with reference to the drawings.

Figure 1:
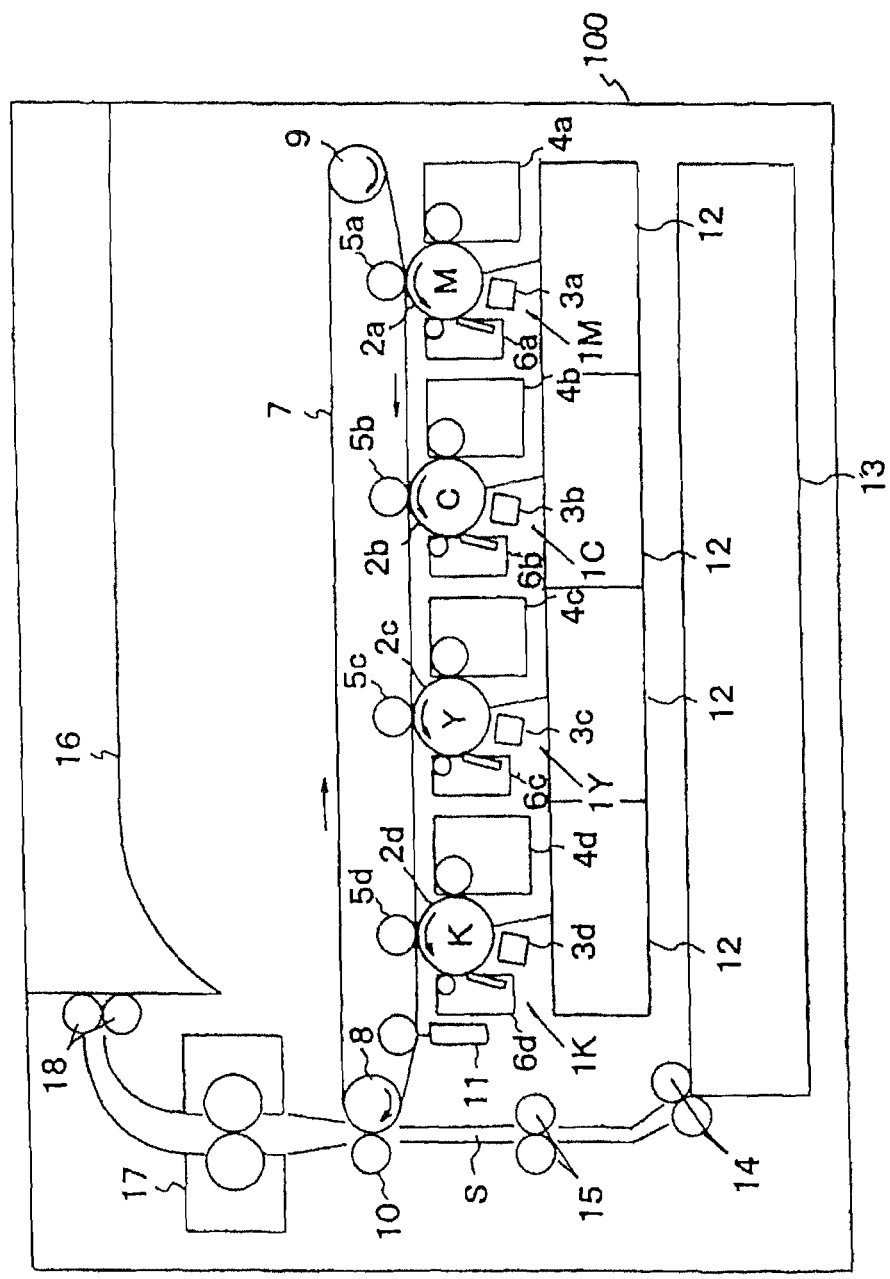
FIG. 1 is a side sectional view generally illustrating an inner structure of an image forming apparatus according to an embodiment of the present disclosure.

FIG. 1 is a side sectional view of a color laser printer as an embodiment of an image forming apparatus according to the present disclosure. A magenta image forming unit 1M, a cyan image forming unit 1C, a yellow image forming unit 1Y, and a black image forming unit 1K spaced apart from one another by a certain distance are arranged in tandem with one another in a central portion of the interior of a main body 100 of the image forming apparatus.

The image forming units 1M, 1C, 1Y, and 1K are respectively provided with photoconductor drums 2a, 2b, 2c, and 2d, which serve as image carriers. Chargers 3a, 3b, 3c, and 3d, developing devices 4a, 4b, 4c, and 4d, transfer rollers 5a, 5b, 5c, and 5d, and cleaning devices 6a, 6b, 6c, and 6d are positioned around the corresponding photoconductor drums 2a, 2b, 2c, and 2d.

As illustrated, each of the photoconductor drums 2a, 2b, 2c, and 2d is a drum-shaped photoreceptor and rotated by a drive motor (not shown) in a corresponding one of the directions indicated by the arrow (counterclockwise direction) illustrated in FIG. 1. The chargers 3a, 3b, 3c, and 3d each uniformly charge the surface of a corresponding one of the photoconductor drums 2a, 2b, 2c, and 2d to a specified potential.

Furthermore, the developing devices 4a, 4b, 4c, and 4d respectively contain a magenta (M) toner, a cyan (C) toner, a yellow (Y) toner, and a black (K) toner. The developing devices 4a, 4b, 4c, and 4d each cause the toner of a corresponding one of the colors to be attracted to an electrostatic latent image formed on a corresponding one of the photoconductor drums 2a, 2b, 2c, and 2d so as to visualize each electrostatic latent image as a color toner image.

The transfer rollers 5a, 5b, 5c, and 5d can be in contact with corresponding photoconductor drums 2a, 2b, 2c, and 2d in respective primary transfer units through an intermediate transfer belt 7. The intermediate transfer belt 7 is looped over a drive roller 8 and a tension roller 9 and can run on upper surface sides of the photoconductor drums 2a, 2b, 2c, and 2d. In a secondary transfer unit, the drive roller 8 can be in contact with a secondary transfer roller 10 through the intermediate transfer belt 7. An optical density sensor 11 is located at a position near the drive roller 8 so as to oppose the intermediate transfer belt 7.

A total of four optical scanning devices 12 according to an embodiment of the present disclosure are positioned below the image forming units 1M, 1C, 1Y, and 1K in the printer main body 100. A paper feed cassette 13 is removably provided in a bottom portion of the printer main body 100. A plurality of sheets of paper (not shown) are loaded, such that the sheets are stacked one on top of another in the paper feed cassette 13. A transportation roller pair 14 is located near the paper feed cassette 13. The transportation roller pair 14 picks up each of the sheets from the paper feed cassette 13 and feeds one sheet at a time toward a transportation path S.

A registration roller pair 15 is located in the transportation path S, which extends in the up-down direction in a side portion of the printer main body 100. The registration roller pair 15 causes each sheet to temporarily waited and then, at specified timing, causes the sheet to be fed to the secondary transfer unit where the drive roller 8 and the secondary transfer roller 10 are in contact with each other.

The transportation path S, which is vertically positioned at one side portion of the printer main body 100, extends to a delivery tray 16 located on an upper surface of the printer main body 100. A fixing device 17 and a paper ejection roller pair 18 are located in the middle of the transportation path S.

Next, an embodiment of an image forming operation performed by the color laser printer having the above-described structure is described.

An image formation starting signal causes the photoconductor drums 2a, 2b, 2c, and 2d of the image forming unit 1M, 1C, 1Y, and 1K to rotate in the direction of the respective arrows (counterclockwise direction) in FIG. 1. The photoconductor drums 2a, 2b, 2c, and 2d are uniformly charged by the respective chargers 3a, 3b, 3c, and 3d. The optical scanning devices 12 emit light beams, which have been modulated by color image signals of the respective colors, toward the surfaces of the respective photoconductor drums 2a, 2b, 2c, and 2d so as to form electrostatic latent images corresponding to the respective color image signals on the photoconductor drums 2a, 2b, 2c, and 2d.

The developing device 4a, to which a developing bias of the same polarity as that of the photoconductor drum 2a is applied, causes a magenta toner to be attracted onto the electrostatic latent image formed on the photoconductor drum 2a of the magenta image forming unit 1M, thereby visualizing the electrostatic latent image as a magenta toner image. In the primary transfer unit between the photoconductor drum 2a and the transfer roller 5a, the magenta toner image is transferred onto the intermediate transfer belt 7 being rotated in the direction indicated by the arrows in FIG. 1 through primary transfer caused by an operation of the transfer roller 5a, to which a primary transfer bias having a polarity opposite to that of the toner is applied.

The intermediate transfer belt 7, onto which the magenta toner image has been transferred as described above, is moved to the next cyan image forming unit 1C. In the cyan image forming unit 1C, a cyan toner image, which has been formed on the photoconductor drum 2b similarly to the above-described magenta toner image, is transferred onto the magenta toner image on the intermediate transfer belt 7 so as to be superposed with the magenta toner image in the primary transfer unit.

Likewise, yellow and black toner images, which have been respectively formed on the yellow and black photoconductor drums 2c and 2d, are sequentially superposed on the magenta and cyan toner images, having been transferred onto the intermediate transfer belt 7 in the respective primary transfer units. Thus, a full color toner image is formed on the intermediate transfer belt 7. Residual toners, which have not been transferred onto the intermediate transfer belt 7 and remain on the photoconductor drums 2a, 2b, 2c, and 2d, are removed by the respective cleaning devices 6a, 6b, 6c, and 6d. The photoconductor drums 2a, 2b, 2c, and 2d are prepared for the next image formation.

The sheet, having been fed from the paper feed cassette 13 to the transportation path S by the transportation roller pair 14, is transported to the secondary transfer unit by the registration roller pair 15 at a timing when a leading end of the full-color toner image on the intermediate transfer belt 7 reaches the secondary transfer unit between the drive roller 8 and the secondary transfer roller 10. By using the secondary transfer roller 10, to which a secondary transfer bias having a polarity that is opposite to that of the toners is applied, the individual toner images of the full-color toner image are collectively transferred through secondary transfer from the intermediate transfer belt 7 onto the sheet having been transported to the secondary transfer unit.

The sheet, onto which the full-color toner image has been transferred, is transported to the fixing device 17, so that the full-color toner image is heated and pressed so as to be thermally fixed onto the surface of the sheet. The sheet, onto which the full-color toner image has been fixed, is ejected onto the delivery tray 16 by the paper ejection roller pair 18. Thus, a series of image forming operations are completed.

Next, the basic configuration and operation of the optical scanning devices 12 according to an embodiment of the present disclosure will be described below with reference to FIG. 2. Since the four optical scanning devices 12 have the same structure, one of the optical scanning devices 12 represents the four optical scanning devices 12 in the following description.

The optical scanning device 12 according to an embodiment of the present disclosure includes an optical base 19 as a housing thereof. A wall portion 19a perpendicularly stands on the optical base 19. A laser diode 20 as a light source is attached to the wall portion 19a. Furthermore, a collimator lens 21, a cylindrical lens 22, and a polygon mirror 23 as a deflector are located in the optical base 19. The collimator lens 21, the cylindrical lens 22, and the polygon mirror 23 are positioned in a straight line in the direction in which a light beam L is emitted from the laser diode 20.

Two fθ lenses 24 and 25 and a folding mirror 26 are located in the optical base 19 in the direction in which the light beam L having been deflected by the polygon mirror 23 travels.

Furthermore, a synchronization sensor 27 and a light guiding mirror 28 are located at respective positions between the fθ lens 25 and the folding mirror 26 outside the respective ends of an effective scanning range R of the light beam L. The light guiding mirror 28 reflects the light beam L1 so that the light beam L1 is guided to the synchronization sensor 27. The effective scanning range refers to a scanning range used as an actual printing width.

The synchronization sensor 27 outputs a synchronization signal when detecting the light beam L1, which is deflected by the polygon mirror 23 and travels in an optical path deviated from the effective scanning range R. The synchronization sensor 27 uses one of a variety of optical sensors such as a photodiode, a phototransistor, or a photo integrated circuit (IC).

In an embodiment, the light guiding mirror 28 is attached so as to be inclined by a specified angle relative to the horizontal plane (main scanning plane). The light guiding mirror 28 reflects the light beam L1 that has been deflected by the polygon mirror 23 and travels in the optical path deviated from the effective scanning range R, thereby causing the light beam L1 to be incident upon the synchronization sensor 27. In contrast, the light beam L, which has been deflected by the polygon mirror 23 and travels in an optical path within the effective scanning range R, strikes the folding mirror 26 and scans the photoconductor drum 2a (2b, 2c, or 2d) in the main scanning direction.

Figure 2:
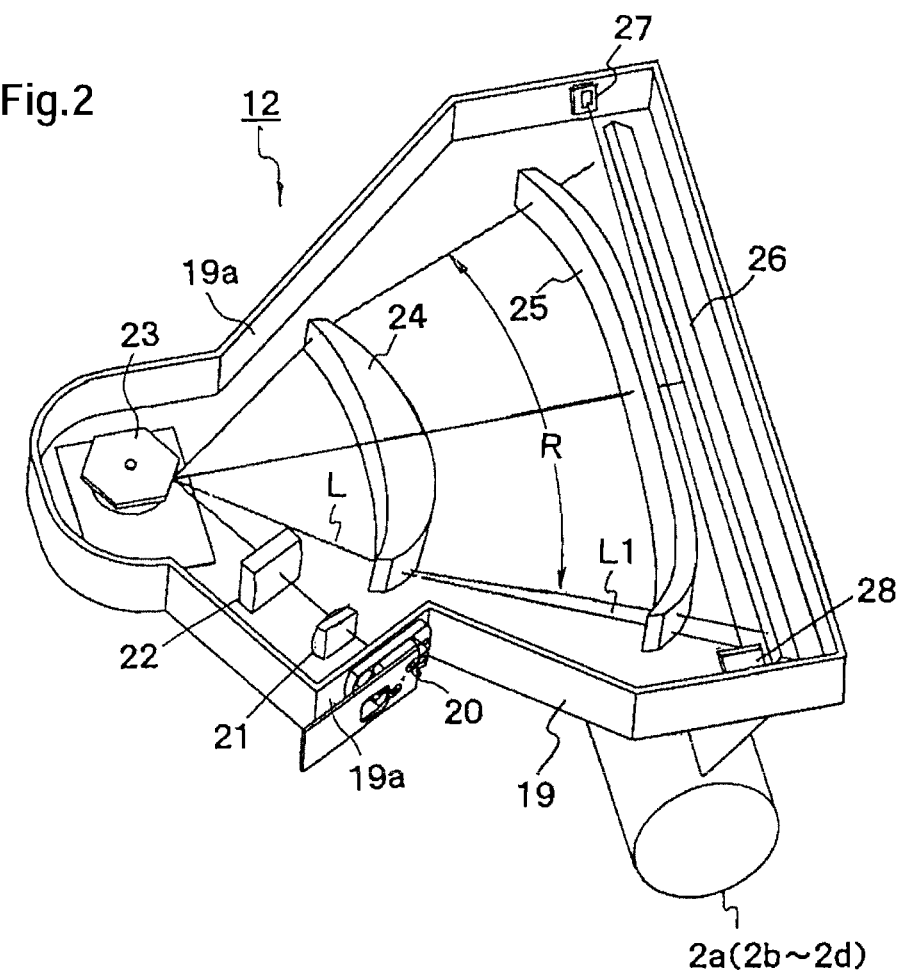
FIG. 2 is a perspective view of an optical scanning device according to an embodiment of the present disclosure.

In the optical scanning device 12 illustrated in FIG. 2 and having the above-described structure, when the laser diode 20 is turned on or off in accordance with the image signal, the light beam L, which has been modulated corresponding to image data, is emitted by the laser diode 20. The collimator lens 21 collimates the light beam L. The cylindrical lens 22 has power only in the subscanning direction and causes the light beam L to form an image on a reflection surface of the polygon mirror 23 that has power only in the subscanning direction. The polygon mirror 23, which is being rotated at a high speed, deflects the light beam L. The deflected light beam L is concentrated and caused to move at a uniform speed by the fθ lenses 24 and 25, and then folded by the folding mirror 26 so as to form a concentrated light spot on the photoconductor drum 2a (2b, 2c, or 2d), which is a scanning target surface. Thus, the photoconductor drum 2a (2b, 2c, or 2d) is scanned in the main scanning direction. Electrostatic latent images corresponding to the color image signals are formed on the respective photoconductor drums 2a, 2b, 2c, and 2d.

The light beam L1 is reflected by the light guiding mirror 28 and travels to the synchronization sensor 27. When the light beam L1 is incident upon the synchronization sensor 27, the synchronization sensor 27 detects the light beam L1 and outputs a synchronization signal. The timing at which the light beam L starts to scan the photoconductor drum 2a (2b, 2c, or 2d) is determined by the synchronization signal.

Next, the structure in which the fθ lens 24 is secured will be described below with reference to FIGS. 3 to 7.

Figure 3:
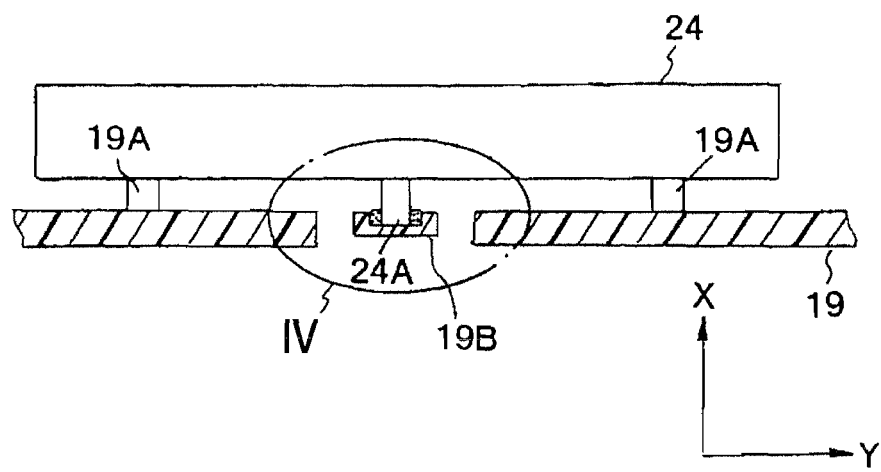
FIG. 3 is a sectional view illustrating a structure in which an fθ lens of the optical scanning device is secured according to an embodiment of the present disclosure.

As illustrated in FIG. 3, height positioning bosses 19A perpendicularly protrude at two positions of the optical base 19 in the longitudinal direction of the fθ lens 24 (left-right direction, that is, Y-direction in FIG. 3). A bonding portion 19B, which is elastically deformable in the up-down direction, is formed between the two height positioning bosses 19A of the optical base 19 (for more detail, formed at a position corresponding to a longitudinally central portion of the fθ lens 24).

Figure 5:
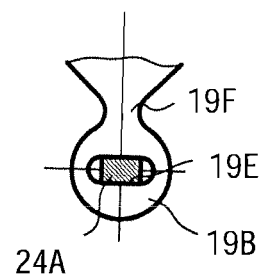
FIG. 5 is a sectional view taken along line V-V in FIG. 4.
Figure 6:
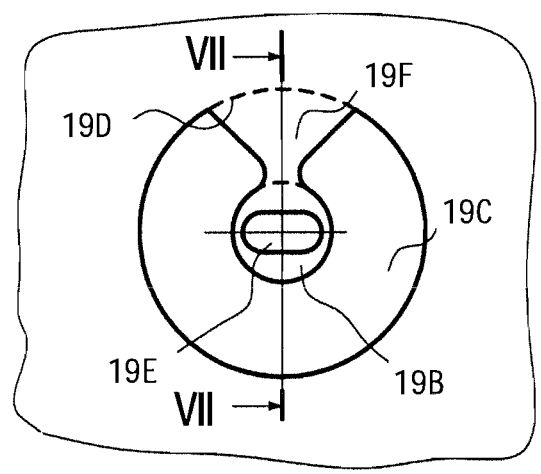
FIG. 6 is a top view of a bonding portion of an optical base of the optical scanning device according to an embodiment of the present disclosure.

As illustrated in FIGS. 5, 6, and 7, the optical base 19 has an optical base main body 19G and a proximal end portion 19F that connects the optical base main body 19G and the bonding portion 19B to each other. The bonding portion 19B is defined by a circular tongue piece and is elastically deformable in the up-down direction while being supported at a portion where the optical base main body 19G and the proximal end portion 19F are connected to each other. A C-shaped through hole 19C is formed around the bonding portion 19B except for the proximal end portion 19F. An arc-shaped groove 19D is formed on the rear surface of the proximal end portion 19F of the bonding portion 19B of the optical base 19 as illustrated in FIG. 7. Since the groove 19D is formed, the thickness of the proximal end portion 19F is decreased as compared to the thicknesses of the optical base main body 19G and the bonding portion 19B. Thus, the bonding portion 19B is elastically deformable in the up-down direction while being supported at a portion where the optical base main body 19G and the proximal end portion 19F are connected to each other.

A groove 19E is formed in a central portion of the bonding portion 19B of the optical base 19. The groove 19E is elongated in the longitudinal direction of the fθ lens 24 (left-right direction in FIG. 6 and main scanning direction).

A square column-shaped protrusion portion 24A is formed on a lower surface of the fθ lens 24 at the center in the longitudinal direction of the fθ lens 24. The protrusion portion 24A is integrally formed with the fθ lens 24 so as to perpendicularly protrude downward from the fθ lens 24 (see FIGS. 3 and 4).

The fθ lens 24 is positioned and bonded to the optical base 19 in the following procedure.

Figure 4:
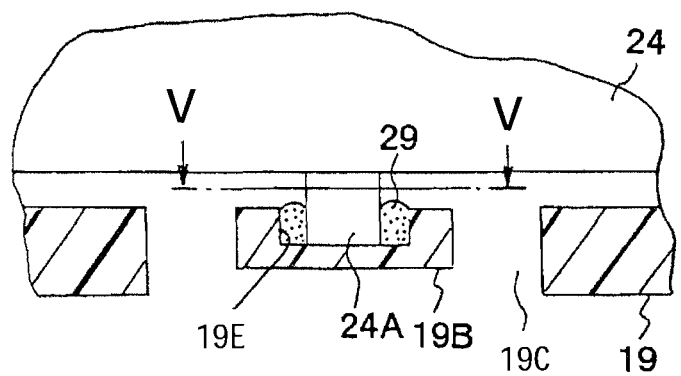
FIG. 4 is an enlarged detailed view of part IV in FIG. 3.

The fθ lens 24 is placed on the two height positioning bosses 19A of the optical base 19 as illustrated in FIG. 3 and the protrusion portion 24A of the fθ lens 24 falls into the groove 19E formed in the bonding portion 19B of the optical base 19 as illustrated in FIGS. 4 and 5. Thus, the fθ lens 24 is positioned in the height direction (X-direction in FIG. 3). As illustrated in FIGS. 3 and 4, by bonding a region around the protrusion portion 24A, which falls into the groove 19E of the optical base 19, using an adhesive 29, a point of the fθ lens 24 at the longitudinal center of the fθ lens 24 is bonded to the bonding portion 19B of the optical base 19. The adhesive 29 is an ultraviolet (UV) curable adhesive.

In an embodiment, stress caused by contraction of the adhesive 29 that occurs as the adhesive 29 cures can be absorbed by elastic deformation of the bonding portion 19B of the optical base 19 in the up-down direction. This can suppress the situation where the height positioning bosses 19A of the optical base 19 is overstressed. Accordingly, the fθ lens 24 can be precisely positioned in the up-down direction with a simple structure.

In an embodiment, the fθ lens 24 is bonded to the bonding portion 19B. This can reduce shearing stress, which is caused by the difference between the thermal expansion coefficients of the fθ lens 24 and the optical base 19 in the portion where the fθ lens 24 and the optical base 19 are bonded to each other. As a result, deformation and separation of the fθ lens 24 can be suppressed.

As described above, the fθ lens 24 of the optical scanning device 12 is precisely positioned and separation of the fθ lens 24 from the optical base 19 is suppressed. This maintains high scanning performance of the optical scanning device 12, and accordingly, high-quality images can be obtained with the color laser printer illustrated in FIG. 1.

Although a structure in which the fθ lens 24 is attached has been described, other optical elements such as the fθ lens 25, the collimator lens 21, and the cylindrical lens 22 can be bonded to the optical base 19 also by using a similar securing structure.

In the above-described embodiment, the height positioning bosses 19A and the bonding portion 19B are located in the optical base 19. Alternatively, a height positioning boss and an elastically deformable bonding portion may be located on the side of the θ lens 24 as the optical element. In this case, the height positioning boss of the fθ lens 24 is placed on the optical base 19, and the bonding portion formed in the longitudinally central portion of the fθ lens 24 is bonded to the optical base 19.

In the above description of the embodiment, the present disclosure is applied to the color laser printer and the optical scanning device 12 equipped in the color laser printer. Also, the present disclosure is similarly applicable to other image forming apparatuses including a monochrome printer and a copier and similarly applicable to an optical scanning device equipped in any of such image forming apparatuses.

Furthermore, the present disclosure is similarly applicable to optical scanning devices equipped in a projector, a plasma television, a laser microscope, and the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical scanning device comprising:
an optical element;
an optical base, the optical element being positioned on the optical base;
a height positioning boss that is provided in at least one of the optical element and the optical base and that positions the optical element with respect to vertical orientation; and
a bonding portion provided in the optical base, a longitudinally central portion of the optical element being bonded to the bonding portion,
wherein the bonding portion is elastically deformable in an up-down direction,
wherein the optical base has an optical base main body and a proximal end portion, the proximal end portion connecting the optical base main body and the bonding portion to each other, the thickness of the proximal end portion being smaller than the thickness of the optical base main body, and
wherein a width of a portion where the optical base main body and the proximal end portion are connected to each other, in a top view, is greater than a width of a portion where the bonding portion and the proximal end portion are connected to each other.

2. The optical scanning device according to claim 1, wherein a plurality of the height positioning bosses are provided in the optical base.

3. The optical scanning device according to claim 1, wherein the optical element has a protrusion portion that protrudes from the longitudinally central portion of the optical element; and
the bonding portion has a groove, the protrusion portion being bonded to the groove.

4. The optical scanning device according to claim 3, wherein the groove has an elongated hole shape; and
the optical element is located in the optical base such that the longitudinal direction of the optical element matches the longitudinal direction of the groove.

5. The optical scanning device according to claim 4, wherein the optical element is an fθ lens; and
the longitudinal directions of the optical element and the groove match a main scanning direction.

6. The optical scanning device according to claim 1, wherein the proximal end portion has a sector shape in the top view.

7. An image forming apparatus comprising:
an image carrier; and
an optical scanning device that scans the image carrier with light,
wherein the optical scanning device includes
an optical element,
an optical base, the optical element being positioned on the optical base,
a height positioning boss that is provided in at least one of the optical element and the optical base and that positions the optical element with respect to vertical orientation, and
a bonding portion provided in the optical base, a longitudinally central portion of the optical element being bonded to the bonding portion,
wherein the bonding portion is elastically deformable in an up-down direction,
wherein the optical base has an optical base main body and a proximal end portion, the proximal end portion connecting the optical base main body and the bonding portion to each other, the thickness of the proximal end portion being smaller than the thickness of the optical base main body, and
wherein a width of a portion where the optical base main body and the proximal end portion are connected to each other, in a top view, is greater than a width of a portion where the bonding portion and the proximal end portion are connected to each other.

8. The image forming apparatus according to claim 7, wherein the proximal end portion has a sector shape in the top view.

* * * * *